US012566304B2

(12) United States Patent
Giesen et al.

(10) Patent No.: US 12,566,304 B2
(45) Date of Patent: Mar. 3, 2026

(54) DETECTION OF OPTICAL MODULE MISALIGNMENT USING A LIGHT FREQUENCY REACTIVE AGENT

(71) Applicant: International Business Machines Corporation, Armonk, NY (US)

(72) Inventors: Kyle Indukummar Giesen, Lagrangeville, NY (US); Rafaela Frota, Boca Raton, FL (US); Egduard Ramon Jauregui, Aurora, CO (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 18/346,988

(22) Filed: Jul. 5, 2023

(65) Prior Publication Data

US 2025/0012984 A1     Jan. 9, 2025

(51) Int. Cl.
*G02B 6/42*        (2006.01)
(52) U.S. Cl.
CPC ......... *G02B 6/4239* (2013.01); *G02B 6/4245* (2013.01)
(58) Field of Classification Search
CPC ........................... G02B 6/4239; G02B 6/4245
See application file for complete search history.

(56) References Cited

U.S. PATENT DOCUMENTS

| | | | |
|---|---|---|---|
| 4,190,451 A | 2/1980 | Hares | |
| 7,892,868 B2 | 2/2011 | Chen et al. | |
| 10,204,408 B2 | 2/2019 | Chu et al. | |

| | | | |
|---|---|---|---|
| 10,804,444 B2 | 10/2020 | Hung et al. | |
| 10,985,300 B2 | 4/2021 | Ke et al. | |
| 2003/0142267 A1 | 7/2003 | Gemert et al. | |
| 2005/0252598 A1 | 11/2005 | Reiss | |
| 2016/0136927 A1* | 5/2016 | Shin ........................ B32B 27/34 156/60 |
| 2018/0136255 A1* | 5/2018 | Albert ................ G01R 31/2806 |

(Continued)

FOREIGN PATENT DOCUMENTS

| | | |
|---|---|---|
| CA | 2558334 C | 6/2010 |
| CN | 112203834 A | 1/2021 |

(Continued)

OTHER PUBLICATIONS

Martijn Heck "Laser Sources for Silicon Photonics" https://www.linkedin.com/pulse/laser-sources-silicon-photonics-martijn-heck (Retrieved Jun. 14, 2023), 6 pages.

(Continued)

*Primary Examiner* — Michelle R Connelly
*Assistant Examiner* — Kirsten D. Endresen
(74) *Attorney, Agent, or Firm* — Cantor Colburn LLP; Samuel Waldbaum

(57) ABSTRACT

An optical assembly is provided and includes a first component configured to output light, a second component and an adhesive bonding agent to which a photochromic reactive agent is added and by which the first and second components are attached such that the first component is disposed to output the light toward the second component and such that the photochromic reactive agent is exposed to the light in an event of the first and second components being attached in a misaligned condition whereupon a color change of the photochromic reactive agent resulting from exposure of the photochromic reactive agent to the light is indicative of the misaligned condition.

18 Claims, 5 Drawing Sheets

Misaligned condition
Photochromic effect

(56) References Cited

U.S. PATENT DOCUMENTS

| | | | |
|---|---|---|---|
| 2022/0127184 A1 | 4/2022 | Kiczenski et al. | |
| 2022/0310885 A1 | 9/2022 | Wei | |

FOREIGN PATENT DOCUMENTS

| | | | | |
|---|---|---|---|---|
| JP | 4351940 B2 | 10/2009 | | |
| JP | 5456080 B2 | 3/2014 | | |
| JP | 6715892 B2 | 7/2020 | | |
| WO | 2014071179 A2 | 5/2014 | | |
| WO | WO-2023243636 A1 * | 12/2023 | ......... | H01L 21/6835 |

OTHER PUBLICATIONS

Bjelkhagen, Hans I."Silver-Halide recording materials: For Holography and their processing." vol. 66. Springer, 2013. pp. 321-356.
Dietrich, P-I., et al. "In situ 3D nanoprinting of free-form coupling elements for hybrid photonic integration." Nature Photonics 12.4 (2018): 12 pages.
Oggioni et al. "Holography with photochromic diarylethenes." Materials 12.17 (2019): pp. 1-23.
Patterson et al., "The future of packaging and silicon photonics" https://www.ibm.com/downloads/cas/MONL8N85, (Retrieved Jun. 14, 2023), pp. 1-10.

* cited by examiner

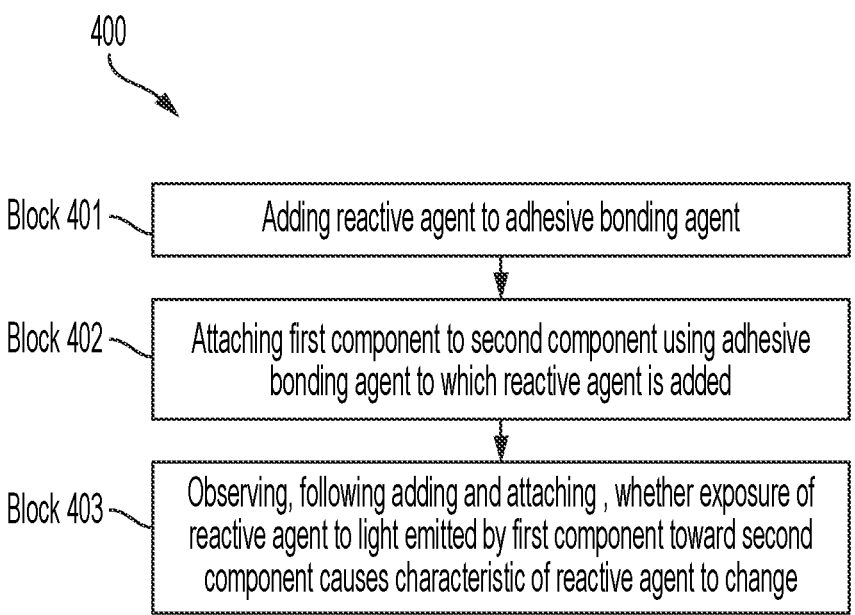

*400*

Block 401 — Adding reactive agent to adhesive bonding agent

Block 402 — Attaching first component to second component using adhesive bonding agent to which reactive agent is added Block 403 — Observing, following adding and attaching , whether exposure of reactive agent to light emitted by first component toward second component causes characteristic of reactive agent to change

Block 501 — Attaching first component to second component using adhesive bonding agent Block 502 — Adding reactive agent to adhesive bonding agent Block 503 — Observing, following attaching and adding, whether exposure of reactive agent to light emitted by first component toward second component causes characteristic of reactive agent to change

DETECTION OF OPTICAL MODULE MISALIGNMENT USING A LIGHT FREQUENCY REACTIVE AGENT

BACKGROUND

The present invention generally relates to module manufacturing. More specifically, the present invention relates to detection of optical module misalignment in manufacturing and field failures using a light frequency reactive agent.

A photonic integrated circuit (PIC) or an integrated optical circuit is a microchip including two or more photonic components that form a functioning circuit. This technology detects, generates, transports and processes light. Photonic integrated circuits utilize photons (or particles of light), as opposed to electrons that are utilized by electronic integrated circuits, and provides functionality for information signals that are imposed on optical wavelengths.

SUMMARY

Embodiments of the invention are directed to an optical assembly. A non-limiting example of the optical assembly includes a first component configured to output light, a second component and an adhesive bonding agent to which a photochromic reactive agent is added and by which the first and second components are attached such that the first component is disposed to output the light toward the second component and such that the photochromic reactive agent is exposed to the light in an event of the first and second components being attached in a misaligned condition whereupon a color change of the photochromic reactive agent resulting from exposure of the photochromic reactive agent to the light is indicative of the misaligned condition.

Embodiments of the present invention are directed to a method of assembling an optical assembly. A non-limiting example of the method includes adding a reactive agent to an adhesive bonding agent, attaching a first component to a second component using the adhesive bonding agent to which the reactive agent is added and observing, following the adding and the attaching, whether exposure of the reactive agent to light emitted by the first component toward the second component causes a characteristic of the reactive agent to change.

Embodiments of the present invention are directed to a method of assembling an optical assembly. A non-limiting example of the optical assembly includes attaching a first component to a second component using an adhesive bonding agent, adding a reactive agent to the adhesive bonding agent and observing, following the attaching and the adding, whether exposure of the reactive agent to light emitted by the first component toward the second component causes a characteristic of the reactive agent to change.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 is a flow diagram illustrating a method of assembling an optical assembly in which a reactive agent is added to an adhesive bonding agent prior to the adhesive bonding agent being used for an attachment in accordance with one or more embodiments of the present invention.

Figure 1:
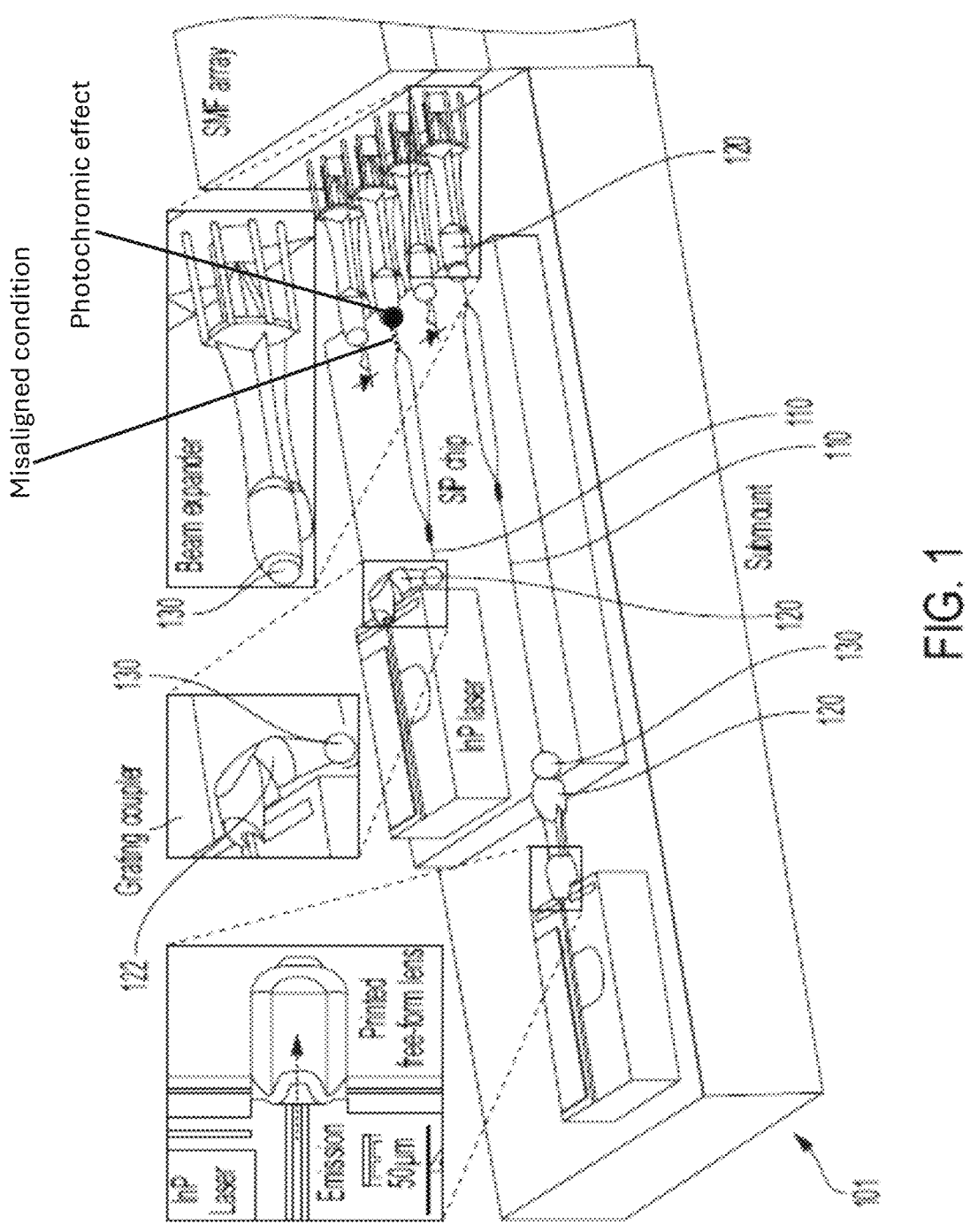
FIG. 1 is a perspective view of an optical assembly with an optical cable attached to a cable receiving component in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to an overview of technologies that are more specifically relevant to aspects of the invention, in PIC design, it is common to need to attach additional optical components to a base module. Such optical components are commonly laser dies or fiber arrays. A method for attaching a laser die to a base module can be referred to as flip chip assembly processing. In flip chip assembly processing, which is also known as direct chip attach (DCA) processing, a laser die is flipped over and bonded to the PIC. The bonding process can be done in two ways: solder bonding of metallic plates adjacent to the functional regions of the die followed by underfilling and using resin-based adhesive bonding agents. A primary method to attach fiber arrays to a base module is by use of an adhesive bonding agent and a polymer lid.

Flip chip assembly processing is most often used for high frequency applications where a compact footprint of the resulting device is required. In these high frequency applications, it is important for the flipped chip to be aligned properly on the base module. It has been found, however, that flip chip assembly processing can be susceptible to signal impacts leading to misalignment of the flipped chip on the base module. In many cases, misalignment of the flipped chip on the base module is a failure mode that is difficult to detect in manufacturing and may often be masked until it is detected much later in a product lifecycle. At present, even upon failure detection, it can be very difficult and time consuming to identify misalignment of the flipped chip as the root cause of a failure mode.

Because flip chip assembly processing is heavily researched, there are certain techniques for identifying bad assemblies using expensive equipment or simulated traffic. Nevertheless, there remains a lack of a solution that allows for a visual identification of misalignment of a flipped chip on a base module, which can be noted by service or lab personnel without the use of additional equipment.

Turning now to an overview of the aspects of the invention, one or more embodiments of the invention address the above-described shortcomings of the prior art by providing an optical assembly. The optical assembly includes a first component configured to output light, a second component and an adhesive bonding agent. A photochromic reactive agent is added to the adhesive bonding agent. The first and second components are attached by the adhesive bonding agent such that the first component is disposed to output the light toward the second component and such that the photochromic reactive agent is exposed to the light in an event of the first and second components being attached in a misaligned condition whereupon a color change of the photochromic reactive agent resulting from exposure of the photochromic reactive agent to the light is indicative of the misaligned condition.

The above-described aspects of the invention address the shortcomings of the prior art by providing for an easy, efficient and innovative way to visualize flip chip assembly misalignment during optical module design processes and allows for a visual identification of a misalignment of a flipped chip on a base module by service or lab personnel without the use of additional equipment.

Figure 2:
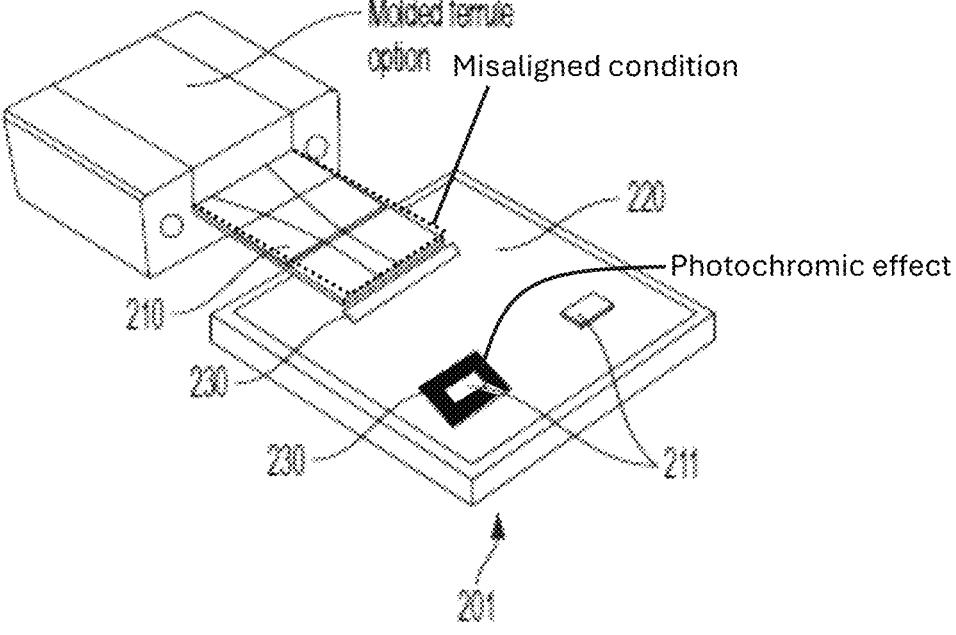
FIG. 2 is a perspective view of an optical assembly with waveguides and a die attached to a PIC in accordance with one or more embodiments of the present invention.
Figure 3:
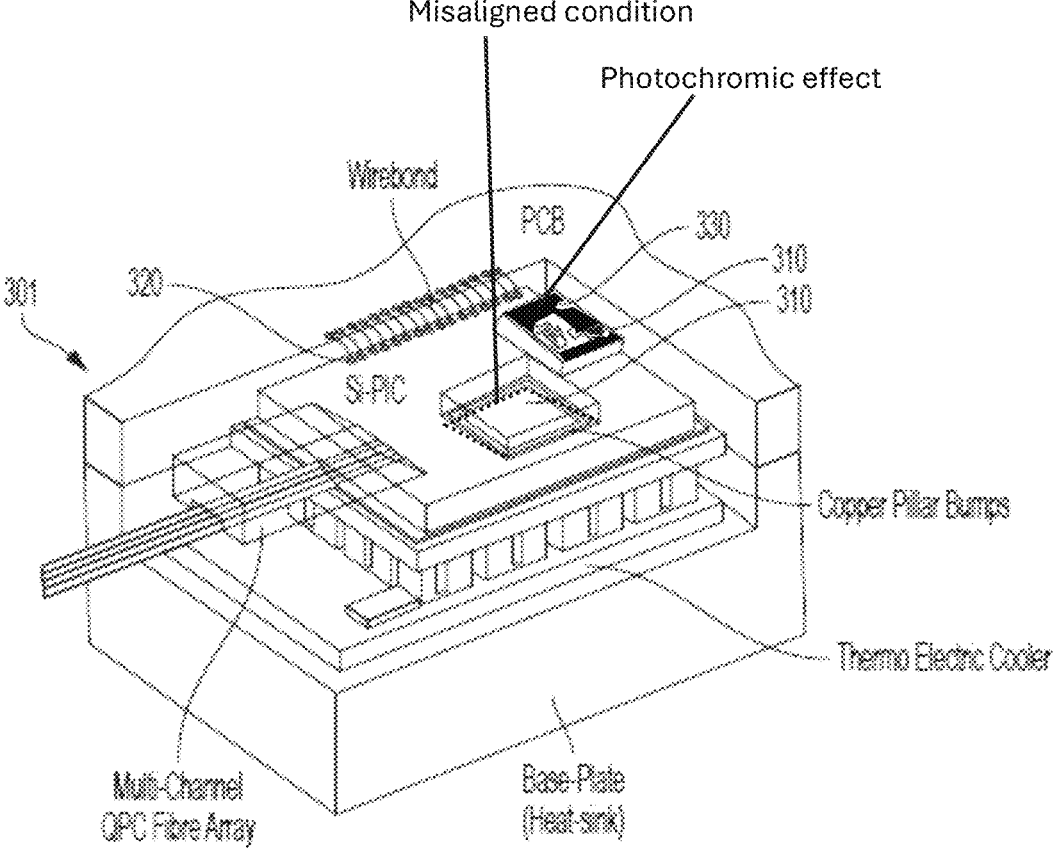
FIG. 3 is a perspective view of an optical assembly with one or more IC dies attached to a PIC in accordance with one or more embodiments of the present invention.

Turning now to a more detailed description of aspects of the present invention, FIGS. 1, 2, and 3 each depict an optical assembly 101, 201, and 301. Each optical assembly 101, 201, 301 includes a first component configured to output light and a second component. In the optical assembly 101 of FIG. 1, the first component is an optical cable 110 and the second component is a cable receiving component 120 to which the optical cable 110 is attachable (i.e., a beam expander 121, a grating coupler 122 or a laser emitter 123). In the optical assembly 201 of FIG. 2, the first component is a waveguide 210 or a die 211 and the second component is a PIC 220 to which the waveguide 210 and the die 211 are attachable along with a plurality of other waveguides and one or more other dies. In the optical assembly 301 of FIG. 3, the first component is one or more integrated circuit (IC) dies 310 and the second component is a PIC 320. Each optical assembly 101, 201, 301 further includes an adhesive bonding agent 130, 230, 330 to which a photochromic reactive agent is added.

In the optical assembly 101 of FIG. 1, the optical cable 110 and the cable receiving component 120 are attached by the adhesive bonding agent 130. The attachment of the optical cable 110 to the cable receiving component 120 is provided such that the optical cable 110 is disposed to output the light toward the cable receiving component 120. Also, the attachment of the optical cable 110 to the cable receiving component 120 is provided such that the photochromic reactive agent, which was added to the adhesive bonding agent, is exposed to the light that is output by the optical cable 110 in an event the optical cable 110 and the cable receiving component 120 are attached in a misaligned condition. In such cases, a characteristic of the photochromic reactive agent, such as a color of the photochromic reactive agent, changes resulting from exposure of the photochromic reactive agent to the light and is indicative of the misaligned condition between the optical cable 110 and the cable receiving component 120. This color change is illustrated in FIG. 1 as the adhesive bonding agent 130 having a black color.

In the optical assembly 201 of FIG. 2, the waveguide 210 and the PIC 220 are attached by the adhesive bonding agent 230 and the die 211 and the PIC 220 are attachable by the adhesive bonding agent 230. The attachments of the waveguide 210 and the die 211 to the PIC 220 are provided such that the waveguide 210 and the die 211 are disposed to output the light toward the PIC 220. Also, the attachments of the waveguide 210 and the die 211 to the PIC 220 are provided such that the photochromic reactive agent, which was added to the adhesive bonding agent, is exposed to the light that is output by the waveguide 210 and the die 211 in an event the waveguide 210 and the PIC 220 are attached in a misaligned condition or in an event the die 111 and the PIC 220 are attached in a misaligned condition. In such cases, a characteristic of the photochromic reactive agent, such as a color of the photochromic reactive agent, changes resulting from exposure of the photochromic reactive agent to the light and is indicative of the misaligned condition between the waveguide 210 and the PIC 220 or between the die 211 and the PIC 220. This color change is illustrated in FIG. 2 as respective portions of the adhesive bonding agent 130 of the waveguide 210 and the die 211 having a black color.

In the optical assembly 301 of FIG. 3, the one or more IC dies 310 and the PIC 320 are attached by the adhesive bonding agent 330. The attachment of the one or more IC dies 310 to the PIC 320 is provided such that the one or more IC dies 310 are disposed to output the light toward the PIC 320. Also, the attachments of the one or more IC dies 310 to the PIC 320 are provided such that the photochromic reactive agent, which was added to the adhesive bonding agent, is exposed to the light that is output by the one or more IC dies 310 in an event the one or more IC dies 310 and the PIC 320 are attached in one or more misaligned conditions. In such cases, a characteristic of the photochromic reactive agent, such as a color of the photochromic reactive agent, changes resulting from exposure of the photochromic reactive agent to the light and is indicative of the one or more misaligned conditions between the one or more IC dies 310 and the PIC 320. This color change is illustrated in FIG. 3 as the adhesive bonding agent 130 for one of the one or more IC dies 310 having a black color.

In accordance with one or more embodiments of the present invention, the light output by the optical cable 110 of FIG. 1, the waveguide 210 of FIG. 2 and the IC die 310 of FIG. 3 can be in the form of a laser. In accordance with one or more further embodiments of the present invention, the laser can have at least one or more of a wavelength of 850 nm and a wavelength of 1310 nm or other industry supported wavelengths. In each of these or other cases, a misaligned condition of the first and second components causes the light to reflect off the second component and spread outwardly in a Guassian distribution whereby the light becomes incident on the photochromic reactive agent, which was added to the adhesive bonding agent, causing the photochromic reactive agent to change color. The photochromic reactive agent, which was added to the adhesive bonding agent, can include silver halides and at least one of chromenes, spiropyrans, mercury dithiozonate, fulgides, and fulgimides. The presence of the silver halides particularly allows for a photochromic effect due to misalignment to be focused on a desired wavelength of light (i.e., 850 nm or 1310 nm).

With reference to FIG. 4, a method 400 of assembling an optical assembly, such as the optical assembly 101 of FIG. 1, the optical assembly 201 of FIG. 2 and the optical assembly 301 of FIG. 3, is provided. The method 400 includes adding a reactive agent to an adhesive bonding agent (block 401), such as by mixing the reactive agent with the adhesive bonding agent, attaching a first component to a second component using the adhesive bonding agent to which the reactive agent is added (block 402) and observing, following the adding and the attaching, whether exposure of the reactive agent to light emitted by the first component toward the second component causes a characteristic of the reactive agent to change (block 403).

Figure 5:
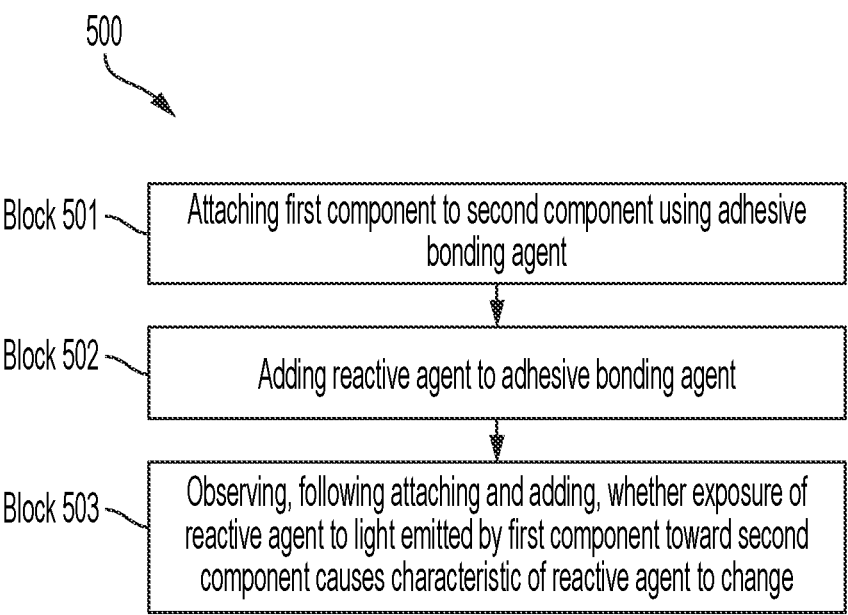
FIG. 5 is a flow diagram illustrating a method of assembling an optical assembly in which a reactive agent is added to an adhesive bonding agent following the adhesive bonding agent being used for an attachment in accordance with one or more embodiments of the present invention.

With reference to FIG. 5, a method 500 of assembling an optical assembly, such as the optical assembly 101 of FIG. 1, the optical assembly 201 of FIG. 2 and the optical assembly 301 of FIG. 3, is provided. The method 500 includes attaching a first component to a second component using an adhesive bonding agent (block 501), adding a reactive agent to the adhesive bonding agent (block 502), such as by coating the reactive agent over the adhesive bonding agent, and observing, following the attaching and the adding, whether exposure of the reactive agent to light emitted by the first component toward the second component causes a characteristic of the reactive agent to change (block 503).

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising,"

"includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The term "conformal" (e.g., a conformal layer) means that the thickness of the layer is substantially the same on all surfaces, or that the thickness variation is less than 15% of the nominal thickness of the layer.

The terms "epitaxial growth and/or deposition" and "epitaxially formed and/or grown" mean the growth of a semiconductor material (crystalline material) on a deposition surface of another semiconductor material (crystalline material), in which the semiconductor material being grown (crystalline overlayer) has substantially the same crystalline characteristics as the semiconductor material of the deposition surface (seed material). In an epitaxial deposition process, the chemical reactants provided by the source gases can be controlled and the system parameters can be set so that the depositing atoms arrive at the deposition surface of the semiconductor substrate with sufficient energy to move about on the surface such that the depositing atoms orient themselves to the crystal arrangement of the atoms of the deposition surface. An epitaxially grown semiconductor material can have substantially the same crystalline characteristics as the deposition surface on which the epitaxially grown material is formed. For example, an epitaxially grown semiconductor material deposited on a {100} orientated crystalline surface can take on a {100} orientation. In some embodiments of the invention, epitaxial growth and/or deposition processes can be selective to forming on semiconductor surface, and cannot deposit material on exposed surfaces, such as silicon dioxide or silicon nitride surfaces.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants.

Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An optical assembly, comprising:
a first component configured to output light;
a second component; and
an adhesive bonding agent to which a photochromic reactive agent is added and by which the first and second components are attached such that the first component is disposed to output the light toward the second component,
wherein:
the photochromic reactive agent is not exposed to the light in an event of the first and second components being attached in an optically aligned condition, and
the photochromic reactive agent is exposed to the light in an event of the first and second components being attached in an optically misaligned condition whereupon a color change of the photochromic reactive agent resulting from exposure of the photochromic reactive agent to the light is indicative of the optically misaligned condition.

2. The optical assembly according to claim 1, wherein at least one of the first and second components is an optical cable.

3. The optical assembly according to claim 1, wherein the first component comprises at least one of a waveguide and an integrated circuit die, the second component comprises a photonic integrated circuit (PIC) and the light emitted by the first component is a laser.

4. The optical assembly according to claim 1, wherein the reactive agent comprises silver halides and at least one of chromenes, spiropyrans, mercury dithiozonate, fulgides, and fulgimides.

5. A method of assembling an optical assembly, comprising:

adding a photochromic reactive agent to an adhesive bonding agent;

attaching a first component to a second component following the adding of the photochromic reactive agent to the adhesive bonding agent using the adhesive bonding agent to which the photochromic reactive agent is added; and observing, following the adding and the attaching, whether exposure of the photochromic reactive agent to light emitted by the first component toward the second component causes a color of the photochromic reactive agent to change to determine whether the first and second components are optically aligned or optically misaligned, wherein:

the photochromic reactive agent is not exposed to the light when the first and second components are optically aligned and does not change color, and the photochromic reactive agent is exposed to the light when the first and second components are optically misaligned and does change color.

6. The method according to claim 5, wherein at least one of the first and second components is an optical cable.

7. The method according to claim 5, wherein the first component comprises a waveguide and the second component comprises a photonic integrated circuit (PIC).

8. The method according to claim 7, wherein the optical component comprises at least one of a waveguide and an integrated circuit die.

9. The method according to claim 5, wherein the light has at least one of a wavelength of about 850 nm and a wavelength of about 1310 nm.

10. The method according to claim 5, wherein the photochromic reactive agent comprises silver halides.

11. The method according to claim 10, wherein the photochromic reactive agent further comprises at least one of chromenes, spiropyrans, mercury dithiozonate, fulgides, and fulgimides.

12. A method of assembling an optical assembly, the method comprising:

attaching a first component to a second component using an adhesive bonding agent;

adding a photochromic reactive agent to the adhesive bonding agent following the attaching of the first component to the second component using the adhesive bonding agent; and observing, following the attaching and the adding, whether exposure of the photochromic reactive agent to light emitted by the first component toward the second component causes a color of the photochromic reactive agent to change to determine whether the first and second components are optically aligned or optically misaligned, wherein:

the photochromic reactive agent is not exposed to the light when the first and second components are optically aligned and does not change color, and the photochromic reactive agent is exposed to the light when the first and second components are optically misaligned and does change color.

13. The method according to claim 12, wherein at least one of the first and second components is an optical cable.

14. The method according to claim 12, wherein the first component comprises a waveguide and the second component comprises a photonic integrated circuit (PIC).

15. The method according to claim 14, wherein the optical component comprises at least one of a waveguide and an integrated circuit die.

16. The method according to claim 12, wherein the light has at least one of a wavelength of about 850 nm and a wavelength of about 1310 nm.

17. The method according to claim 12, wherein the photochromic reactive agent comprises silver halides and the characteristic of the reactive agent is a color.

18. The method according to claim 17, wherein the photochromic reactive agent further comprises at least one of chromenes, spiropyrans, mercury dithiozonate, fulgides and fulgimides.

* * * * *